United States Patent
Kenyon

[15] 3,650,843
[45] Mar. 21, 1972

[54] THERMOCOUPLE

[72] Inventor: Fred V. Kenyon, Anaheim, Calif.

[73] Assignee: Robertshaw Controls Company, Richmond, Va.

[22] Filed: Feb. 15, 1968

[21] Appl. No.: 705,767

Related U.S. Application Data

[63] Continuation-in-part of Ser. No. 651,570, July 6, 1967, Pat. No. 3,522,107.

[52] U.S. Cl. ............................................. 136/217, 136/230
[51] Int. Cl. ........................................................... H01v 1/02
[58] Field of Search ............................... 136/217–220, 221, 136/230, 235, 242, 228

[56] References Cited

UNITED STATES PATENTS

| | | |
|---|---|---|
| 2,161,432 | 6/1939 | Rees ................................. 136/230 X |
| 2,430,887 | 11/1947 | Ray ..................................... 136/217 X |
| 2,474,547 | 6/1949 | Patch ................................. 136/219 X |
| 2,480,557 | 8/1949 | Cummins ............................. 136/221 |
| 2,677,004 | 4/1954 | Biggle ................................. 136/219 |
| 2,952,409 | 9/1960 | Matthews ........................... 136/220 X |
| 2,410,098 | 10/1946 | Muller .............................. 136/235 X |
| 3,290,178 | 12/1966 | Loveland ........................... 136/217 X |
| 3,441,450 | 4/1969 | Frommel .............................. 136/217 |

Primary Examiner—Leland A. Sebastian
Assistant Examiner—Harvey E. Behrend
Attorney—Fulwider, Patton, Rieber, Lee & Utecht

[57] ABSTRACT

A thermocouple which may be attached to any type of support bracket, has a mounting portion and a pair of adaptors thereon in spaced relation to each other with each adaptor having a resilient element cooperating with the mounting portion to enable initial slip-on positioning of the two adaptors which may be finally moved into clamping positions relative to the support bracket.

8 Claims, 18 Drawing Figures

Patented March 21, 1972
3,650,843
3 Sheets-Sheet 1
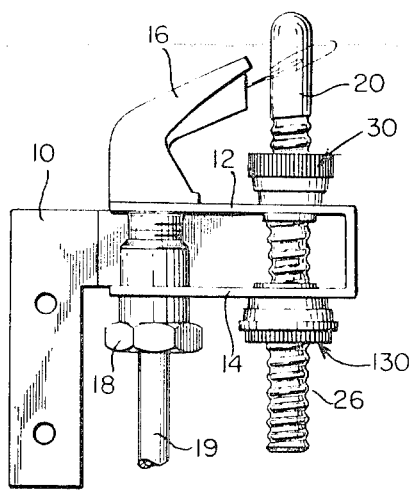
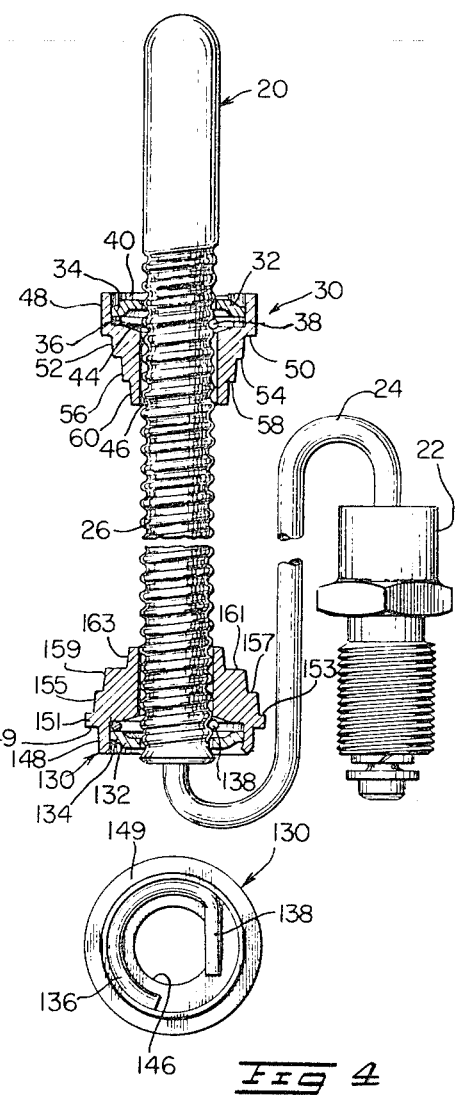
INVENTOR.
FRED V. KENYON
BY Fulwider, Patton, Rieber
Lee and Utecht
ATTORNEYS

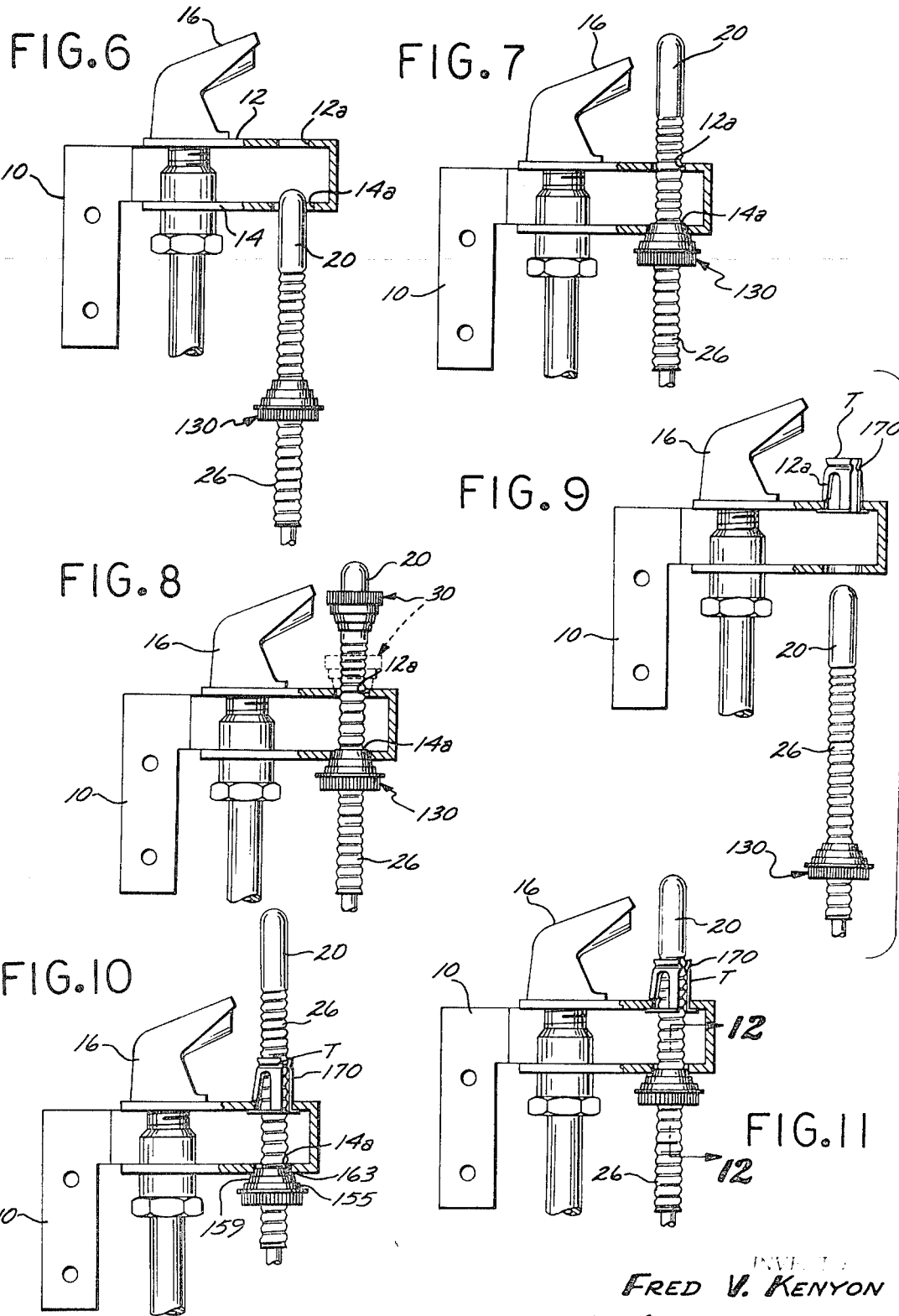

Patented March 21, 1972

INVENTOR.
FRED V. KENYON
BY Fulwider, Patton Rieber,
Lee and Utecht
ATTORNEYS 3,650,843

1

THERMOCOUPLE

CROSS-REFERENCE TO RELATED APPLICATION

This is a continuation-in-part of patent application, Serial No. 651,570 filed July 6, 1967, now U.S. Pat. No. 3,522,107.

BACKGROUND OF THE INVENTION

1. Field of the Invention

This invention relates to a thermocouple and in particular to such a universal thermocouple having a novel mounting arrangement for adjustably supporting the same in a selected oriented position relative to a pilot burner.

2. Description of the Prior Art

The prior art, as exemplified by U.S. Pat. Nos. 2,610,984 and 3,184,337, recognizes the desirability of properly orienting the thermocouple with respect to the flame issuing from the pilot burner and accomplishes this result by means of a unitary mounting bracket. The prior art structures have resulted in the manufacture of a wide variety of thermocouple-pilot mounting assemblies so that, when it is necessary to replace a thermocouple, only the same type of thermocouple by the same manufacturer may be used as a replacement. While making a service call for a defective thermocouple, the serviceman is required to carry a large inventory of replacement thermocouples. In addition, the usual location of the thermocouple adjacent the pilot burner in the burner box of furnace does not present suitable working area for tool manipulation by the serviceman in attaching and detaching the thermocouple.

SUMMARY OF THE INVENTION

It is, therefore, an object of the present invention to construct a universal thermocouple that may be utilized with any type of mounting bracket.

Another object of the invention is to provide a thermocouple with attachment adapters that are frictionally slidable thereon to facilitate assembly without tools.

The simple construction of the thermocouple according to the present invention eliminates the problems of the prior art structures in that a serviceman need only carry a small number of thermocouples because they will fit any type of mounting brackets and in that no tools are needed to attach the thermocouple to the mounting bracket because the adapters are slidable thereon by simple manual movements.

In practicing the present invention, a thermocouple is constructed to include a mounting portion, a pair of adapters disposed on the mounting portion in spaced relation to each other, friction means carried by at least one of said adapters and forming a unitary assembly therewith, and with the friction means defining an operative connection between the mounting portion and its corresponding adapter for sliding the same on the mounting portion relative to the other adapter thereon.

Other objects and advantages of the present invention will become apparent from the following detailed description when taken in conjunction with the accompanying drawings.

BRIEF DESCRIPTION OF THE DRAWINGS

FIG. 1 is a side elevational view of a thermocouple-pilot assembly showing a preferred form of thermocouple embodying the present invention;

FIG. 2 is an enlarged elevational view of the thermocouple shown in FIG. 1 with parts shown in vertical section;

FIG. 3 is a horizontally exploded perspective view of an adapter shown in FIG. 1;

FIG. 4 is a bottom plan view of the adapter of FIG. 3 with a part removed;

FIG. 5 is a bottom plan view showing the detailed of FIG. 3 in assembled relationship;

FIGS. 6, 7 and 8 are side elevational views, partly broken away in section, showing how the form of thermocouple of FIGS. 1-5 may be installed on a pilot burner;

2

Figure 13:
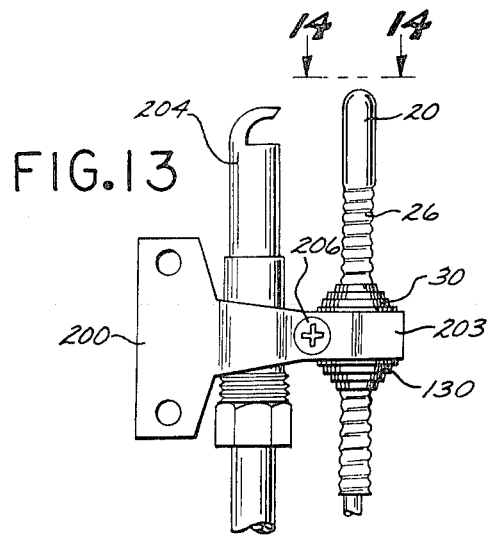
Figure 12:
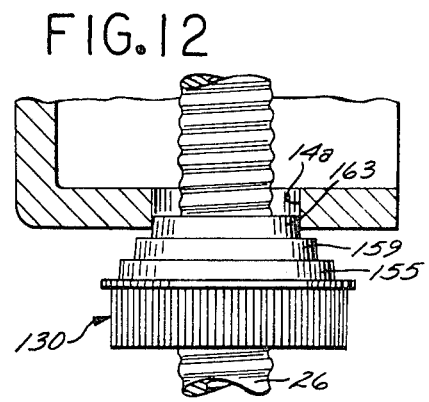
Figure 14:
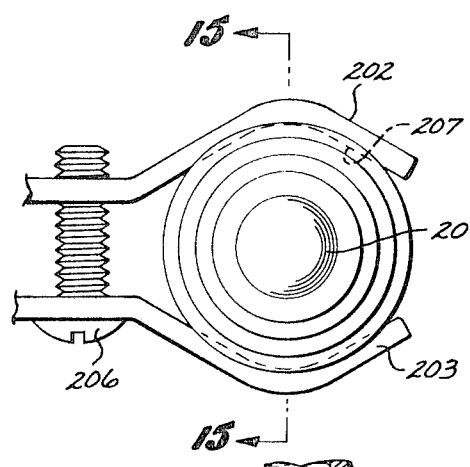
Figure 16:
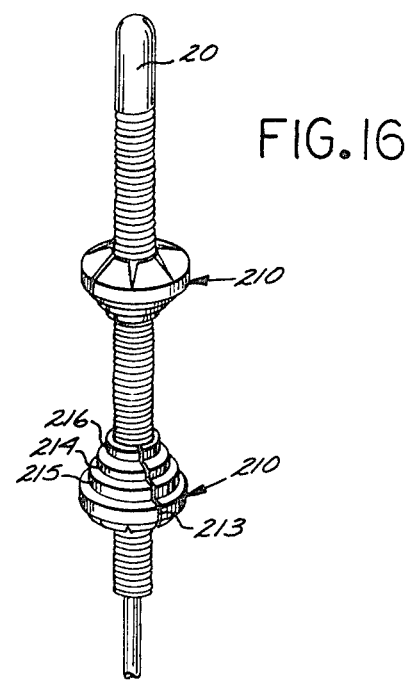
Figure 15:
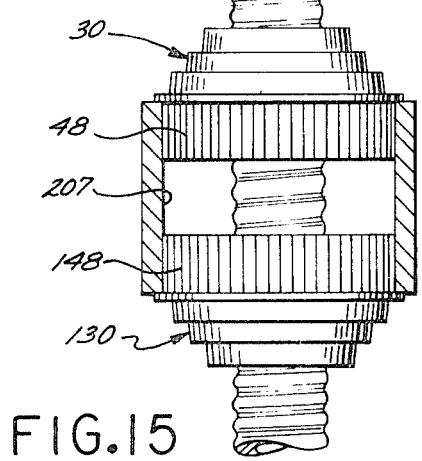
Figure 17:
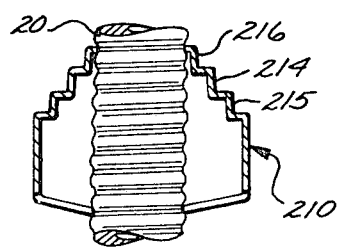
Figure 18:
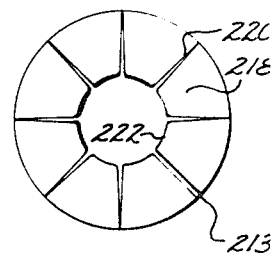

FIGS. 9, 10 and 11 are side elevational views, taken partly in section, showing how the form of thermocouple of FIGS. 1 - through 5 may be installed on a pilot burner having a Tinnerman clip;

FIG. 12 is a broken vertical sectional view, taken in enlarged scale along line 12—12 of FIG. 11;

FIG. 13 is a side elevational view showing how the thermocouple of the present invention may be installed on a clamp type pilot burner;

FIG. 14 is a top plan view taken in enlarged scale along line 14—14 of FIG. 13;

FIG. 15 is a vertical sectional view taken on line 15—15 of FIG. 14;

FIG. 16 is a perspective view showing a second form of adapter embodying the present invention FIG. 17 is a central sectional view of said second form of adapter and FIG. 18 is a top plan view of said second form of adapter

DESCRIPTION OF THE PREFERRED EMBODIMENT

There is shown in FIGS. 1–8 a preferred form of the present invention in assembled relation with a thermocouple-pilot assembly including a flat L-shaped mounting bracket 10, one leg of which is suitably apertured for attachment to main burner apparatus (not shown); the other leg of bracket 10 is provided with a pair of spaced flanges 12 and 14 integrally formed with and extending transversely from opposite edges of such other leg. A pilot burner and hood is secured to the spaced flanges 12 and 14 adjacent one end thereof by means of a coupling nut 18 and is supplied with a pilot flow of fuel by a conduit 19 as is well known in the art. The spaced flanges 12 and 14 are suitably bored adjacent their other end to define aligned apertures 12a and 14a which receive a thermocouple, indicated generally at 20.

The thermocouple 20 has cable connector 22 on one end of a thermocouple tubing 24 for attachment to a suitable thermoelectric appliance (not shown). Adjacent its other end the thermocouple tubing 24 is provided with means for mounting it to the bracket 10. In the preferred embodiment of the present invention, such mounting means includes a portion 26 of the thermocouple and a pair of spaced adapters thereon which cooperate with the thermocouple mounting portion 26 and the flanges of bracket 10.

As best illustrated in FIG. 2, the upper adapter 30 includes a retainer washer 32 with a downwardly extending peripheral flange 34, friction means in the form of a spring clip 36 being generally C-shaped with a chordal terminus 38, and an adapter body having an upper bore 40 terminating at an annular abutment 44 leading to a smaller, lower, concentric bore 46. The exterior of the adapter body is step-tapered commencing with an upper cylindrical wall 48 that terminates in an annular shoulder 50 directed inwardly to a truncated conical wall defining a tapered step 52 which is the largest in diameter of a series of tapered steps. An annular shoulder 54 extends between the step 52 and a truncated conical wall defining a tapered step 56 of intermediate diameter which terminates in an annular shoulder 58 directed to a truncated conical wall defining a tapered step 60 which is the smallest in diameter in the series.

As is shown in FIGS. 2 and 3, the lower adapter 130 generally resembles the construction of the upper adapter 30, accordingly, reference numerals with 100 added are utilized to identify those elements of lower adapter 130 which are identical to those elements of upper adapter 30 so they need not be described again. With respect to those elements of lower adapter 130 which are not identical to those of upper adapter 30, new reference numerals in the 100 series will be utilized. For example, the exterior lower cylindrical wall 148 terminates in an annular shoulder 149 directed outwardly to a larger cylindrical wall 151 which terminates in an annular shoulder 153 directed inwardly to a truncated conical wall defining a tapered step 155 that is the largest in diameter of a series of tapered steps. An annular shoulder 157 extends between the step 155 and a truncated conical wall defining a tapered step 159 of intermediate diameter which terminates in an annular shoulder 161 directed inwardly of a truncated conical wall defining a tapered step 163 which is the smallest in diameter of the series on the lower adapter body.

Each adapter 130 (and 30) is assembled as a unit by placing the spring clip 136 (and 36) in the larger bore 140 (and 40) to rest on the internal abutment 144 (and 44), as is illustrated in FIG. 4. The retainer washer 132 is then placed over the spring clip 136 and held therein by spaced tabs 147 punched in from the peripheral edge of the cylindrical wall 148, as is illustrated in FIG. 5, the upper adapter 30 also has spaced tabs punched in to hold the retainer washer 32 in place.

In the following description of the operative relationship of the above thermocouple, it is to be understood that any other type of supporting bracket 10 may be used, e.g., only a single flange may be utilized and the opening need not be a circular aperture but may be merely a slot. The only requirement for the structure of the bracket is that it has some form of an edge or surface to cooperate with the thermocouple adapters, thus, it is readily apparent that since such an edge or surface is found on every bracket regardless of the manufacture, the thermocouple is truly universal.

With the conventional arrangement of supporting bracket 10 in FIG. 1, the upper and lower flanges 12 and 14 have aligned apertures that are of different diameters. Referring now to FIGS. 6, 7 and 8, the thermocouple 20 of FIGS. 1-5 is assembled on the bracket 10 by first removing the upper adapter 30 and inserting the thermocouple end through the aperture 14a of the lower flange 14 in an upward direction and thence through the upper aperture 12a of the upper flange 12 (FIG. 6). Once the tip of the thermocouple is located so as to be in the flame which will issue from the pilot burner 16, the lower adapter 130 is moved upward or downward by sliding it along the mounting portion 26 until one of its annular shoulders 153, 157 or 161 abuts the undersurface of flange 14 and one of its tapered steps 155, 159 and 163 protrudes through the aperture 14a in the lower flange 14 (FIG. 7). The upper adapter 30 is now slipped onto the thermocouple and moved downward by sliding it along the mounting portion 26 until one of its annular shoulders 50, 54 or 58 abuts the upper surface of flange 12 and one of its tapered steps 52, 56 or 60 protrudes through the aperture 12a in the upper flange 12, as indicated in FIG. 6. The assembled thermocouple-pilot assembly then appears as shown in FIG. 1.

The two adapters 30 and 130 differ in respect to the diameters of their tapered steps so as to conform to various sizes of flange openings or slots on the various steps of supporting brackets. Accordingly, the thermocouple tip may be properly oriented with respect to the pilot burner 16 and the adapters 30 and 130 do not interfere with the other structure on the bracket 10, such as the hood and/or the fastener of the pilot burner 16.

In the above-described arrangement, the bores 46 and 146 of the adapters 30 and 130, respectively, have smooth walls and identical diameters slightly larger than the diameter of the thermocouple 20. Thus, the bores 46 and 146 permit easy sliding for the adapters 30 and 130, respectively, on the thermocouple 20 and act as guide elements during such sliding movement and the moving force need only be large enough to overcome the friction force of the friction elements 36 and 136, respectively. Furthermore, the friction elements 36 and 136 may be integrally formed as parts of the adapters 30 and 130, respectively, in which even the retainers 32 and 132 may be eliminated.

The particular structure of the mounting portion 26 may be varied according to the requirements of particular installations. While the mounting portion 26 of the thermocouple 20 may be a completely smooth cylindrical wall (as its tip end), in the preferred embodiment it is shown as comprising a threaded portion 26 whereby the chordal end 38 (138) of the friction clip 36 (136) is disposed in such threads. As is illustrated in FIG. 4, the circular part of the C-shaped resilient clip 136 abuts the inner wall defining the bore 140 while the chordal end 138 is disposed across a slight chord of the circle defined by the bore 146. Such an arrangement permits press or slip-on positioning of the adapters 30 and 130 with their clip ends 38 and 138 sliding over the crests of the screw threads 26 in the manner of flexing detents. Of course, final positioning may be accomplished by rotating the adapters 30 and 130 whereby the tension on the spring clips 36 and 136, respectively, assists in making a snug fit with the screw threads 26 during final threading. Because of the tapered steps on the exterior of the adapters 30 and 130, such final threading provides a vernier type adjustment to locked positions.

The spring clip 36 (and 136) is made of round stock, such as wire or the like, so that its rounded circumference permits easy flexing and sliding movement over the screw threads 26. Consequently, it is apparent that the rolled type threads 26 may be replaced with other types of threads; for instance, even where a square type of thread is used on the mounting portion 26, the rounded circumference of clip end 36 (and 136) will still permit a push or slip-on movement of the adapter 30 (and 130) since it will slide over the crest of each thread.

The present invention has the additional advantage of quick and easy removal of the thermocouple from the supporting bracket 10 when replacement thereof is necessary. Even during removal, no tools are needed and the removal and subsequent reassembling can be accomplished by an unskilled worker.

Referring now to FIG. 9, there is shown a pilot assembly similar to that shown in FIG. 1 except that the bore 12a of upper flange 12 of this pilot assembly is provided with a conventional Tinnerman clip T to receive thermocouple 20. With continued reference to FIG. 9 and additionally referring to FIGS. 10 and 11, to install a thermocouple 20 embodying the present invention in the pilot assembly of these figures, the thermocouple 20 is moved upwardly through the bore 14a formed in the lower flange 14 and through the Tinnerman clip T, such movement being indicated by directional arrows in FIGS. 9 and 10. Thereafter, the thermocouple 20 is manipulated so that its tip will be disposed in the flame which will issue from the pilot burner 16. This vertical adjustment of the thermocouple 20 is permitted by the ability of the Tinnerman clip T to flex outwardly so that its necked-down upper portion 170 slides along the mounting portion 26 of the thermocouple 20. With the thermocouple 20 arranged at the proper position relative to the pilot burner 16, the lower adapter 130 is slid upwardly until one of its tapered steps 155, 159 or 163 protrudes through the aperture 14a in the lower flange 14, as indicated in FIG. 11. The lower adapter 130 may then be rotated so as to apply tension between the adapter 130 and the lower flange 14.

Referring now to FIG. 12, it will be observed that the diameter of the aperture 14a in the lower flange 14 is greater than the diameter of the top of uppermost step 163, but smaller than the diameter of the bottom of this upper step. Accordingly, the intermediate portion of the sidewalls of upper step 163 engage the sidewalls of the aperture 14a. This arrangement assures that the thermocouple 20 will be restrained against canting relative to the lower flange 14, as would be the case were the sidewalls of the upper step 163 formed parallel with the axis of rotation of the lower adapter 130.

In FIGS. 13 and 14 there is shown a clamp type pilot burner C having a bracket 200 which includes a pair of horizontally aligned clamp arms 202 and 203 disposed outwardly of the pilot burner 204. The clamp arms are adapted to be adjustably urged towards one another by means of a horizontally disposed screw 206, such screw being received within a pair of horizontally aligned threaded bores formed in the inner ends of the clamp arms 202 and 203. The space between the proximate surfaces of arms 202 and 203 define an aperture 207 that receives thermocouple 20.

To mount a thermocouple 20 onto the clamp type assembly C, the upper and lower adapters 30 and 130 are inverted relative to their disposition shown in the preceding figures. These adapters are then slid towards one another along the thermocouple 20 so as to have their walls 48 and 148 grasped between the clamp arms 202 and 203. The adapters are so positioned on the mounting portion 26 that the thermocouple 20 is properly disposed in the flame from the burner 204. The screw 206 is then tightened to securely retain the upper and lower adapters 30 and 130 and hence the thermocouple 20 in place. It should be noted that in the form of the invention shown in FIGS. 13, 14 and 15, the upper adapter 30 has exactly the same construction as the lower adapter 130.

Referring now to FIGS. 16 and 17, there is shown upper and lower like adapters 209 and 210 wherein the spring clip 36 or 136 has been eliminated and instead the adapter is of integral construction. Thus, the adapter is fabricated of a single piece of flexible sheet metal having a cylindrical body 211 formed with an axially extending split 213. The upper portion of body 211 is formed with steps 215, 214 and 216 corresponding to the steps 155, 159 and 163 of the aforedescribed lower adapter 130. The lower portion of the cylindrical body 210 is formed with a plurality of radially inwardly and downwardly extending fingers 218 separated by radially extending slots 220. The radially inner edges of the fingers 218 collectively define a lower bore 222 aligned with an upper bore 224 formed in the top wall of body 211. Bores 222 and 224 receive the threaded mounting portion 26 of the thermocouple 20. The thermocouple 20 is slidably adjusted by slightly flexing the body 211 apart so as to temporarily expand the diameters of bores 222 and 224. Final adjustment is effected by rotating the adapters upon the threads of the thermocouple mounting portion.

Inasmuch as the embodiments of the present invention are subject to many modifications, variations and changes in details, it is intended that all matter contained in the foregoing description or shown on the accompanying drawing shall be interposed as illustrative and not in a limiting sense.

I claim:

1. A universal thermocouple for use with a burner having a mounting bracket formed with aperture means, said thermocouple having an elongated generally cylindrical configuration and comprising: an externally threaded mounting portion that is received by the aperture means of said mounting bracket; and adapter means coaxially disposed on said mounting portion and engageable with said mounting bracket, said adapter means having a flexible cylindrical body formed with an axially extending split, said body also being formed with a plurality of radially extending fingers seperated by radially extending slots, with the radially inner end of said fingers engaging said externally threaded mounting portion when said body is in its relaxed position, whereby initial positioning of said thermocouple relative to said mounting bracket and the flame issuing from said burner is effected by slightly expanding said body apart to temporarily expand the bore defined by said fingers, and final adjustment of said thermocouple relative to said mounting bracket and the flame issuing from said burner is effected by rotating said adapter means on said externally threaded mounting portion of said thermocouple.

2. A universal thermocouple as set forth in claim 1 wherein said fingers are formed at one vertical end of said body and the opposite vertical end of said body is formed with tapered steps for selective engagement with the aperture means of said mounting bracket.

3. A universal thermocouple as set forth in claim 1 wherein said body is formed of an integral piece of flexible sheet metal.

4. A universal thermocouple as set forth in claim 2 wherein said body is formed of an integral piece of flexible sheet metal.

5. A universal thermocouple for use with a burner having a mounting bracket formed with aperture means, said thermocouple having an elongated generally cylindrical configuration and comprising: an externally threaded mounting portion that is received by the aperture means of said mounting bracket; and upper and lower adapters coaxially disposed on said mounting portion in axially spaced relation to each other and engageable with said mounting bracket, each of said adapters having a flexible cylindrical body formed with an axially extending split, said body also being formed with a plurality of radially extending fingers seperated by radially extending slots, with the radially inner end of said fingers engaging said externally threaded mounting portion when said body is in its relaxed position, whereby initial positioning of said thermocouple relative to said mounting bracket and the flame issuing from said burner is effected by slightly extending said body apart to temporarily expand the bore defined by said fingers and final adjustment of said thermocouple relative to said mounting bracket and the flame issuing from said burner is effected by rotating said adapter means on said externally threaded mounting portion of said thermocouple.

6. A universal thermocouple as set forth in claim 5 wherein said fingers are formed at one vertical end of said body and the opposite vertical end of said body is formed with tapered steps for selective engagement with the aperture means of said mounting bracket.

7. A universal thermocouple as set forth in claim 5 wherein the body of each of said adapters is formed of an integral piece of flexible sheet metal.

8. A universal thermocouple as set forth in claim 6 wherein the body of each of said adapters is formed of an integral piece of sheet metal.

* * * * *